June 24, 1969  Z. V. CARTER  3,451,717
CAR WINDOW ARM REST
Filed Aug. 28, 1967
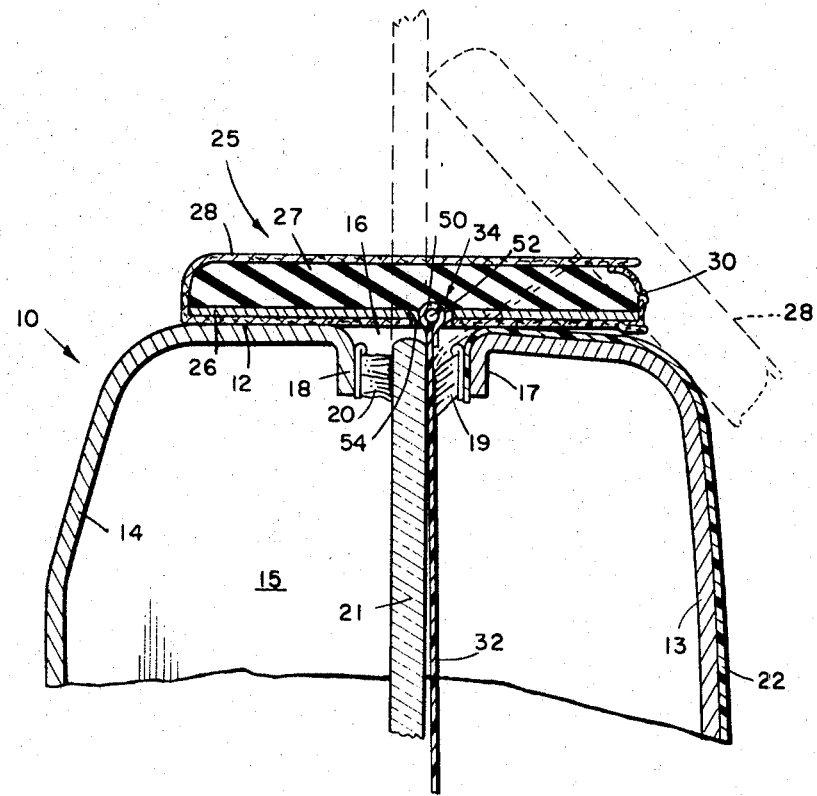
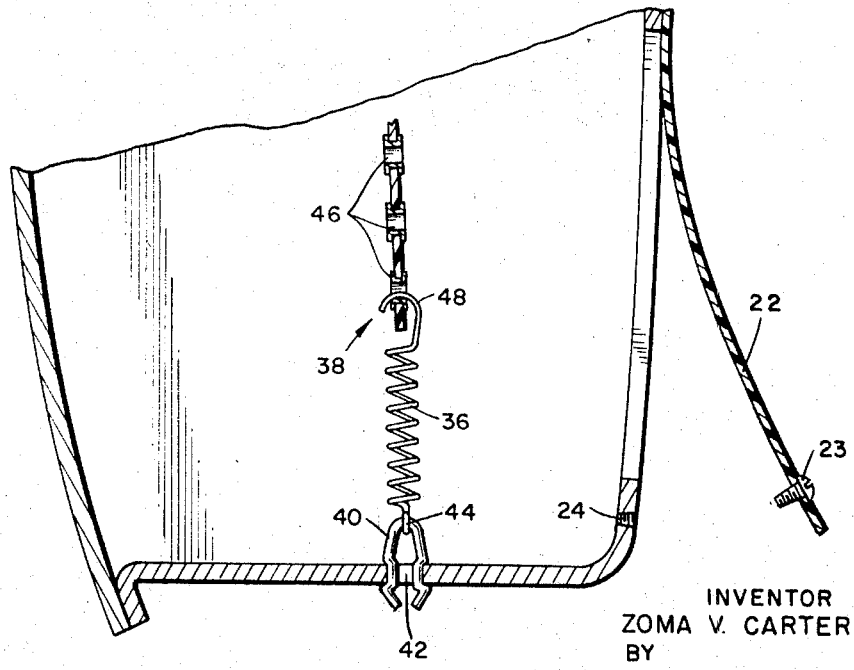
INVENTOR
ZOMA V. CARTER
BY
Hood, Gust & Irish
ATTORNEYS

United States Patent Office 3,451,717
Patented June 24, 1969

3,451,717
CAR WINDOW ARM REST
Zoma Vaughn Carter, 2505 W. Main St.,
Muncie, Ind. 47303
Filed Aug. 28, 1967, Ser. No. 663,851
Int. Cl. B60j 9/00, 1/16, 5/04
U.S. Cl. 296—153      4 Claims

ABSTRACT OF THE DISCLOSURE

An arm rest or cushion for use on the sill of the window in an automobile door, the arm rest being connected to the door by an elastic and flexible connecting means arranged to urge the arm rest downwardly against the sill to span the window pane socket mouth formed therein. The upper end of the connecting means, which extends through the socket mouth, is connected to the bottom of the arm rest and the lower end of the connecting means is connected to the lower portion of the door at a point intermediate the inner and outer walls of the door.

---

The present invention relates to arm rests, and more particularly to the provision of an arm rest for use on the sill of the window in an automobile door.

Many drivers like to rest their elbows on the sill of the window in an automobile door whenever the window pane is fully retracted; but on hot summer days, when the sill is exposed to the sun, it becomes heated to such a degree that it is quite uncomfortable to a bare arm.

Still other reasons may exist to interfere with the comfort of an arm resting on an unprotected sill; and therefore numerous attempts have been made to provide a more comfortable arm rest to be associated with the sill of an automobile window. So far as I am advised, however, most of such devices hitherto conceived have been subject to objectionable characteristics of one kind or another.

According to the present invention, all of the disadvantages of the previously known devices of the general character here under consideration are overcome. For instance, my arm rest may be installed in almost any vehicle, and does not require a specific window sill or socket mouth arrangement. Also, my device is arranged so that the arm rest is resiliently urged downwardly against the window sill to span the mouth formed therein, the force with which the arm rest is urged against the sill being selectively established when the device is installed.

It is a primary object of my invention, therefore, to provide such an arm rest which shall be simple and inexpensive in construction, easy to install and remove, automatic in operation and quiet in use.

A further object of my invention is to provide a device of the character described which is self-retaining when mounted in the intended manner in association with an automobile window, which will not rattle whether in or out of use position, which will not be likely to mar the finish of the automobile and which will be readily shiftable into and out of use position.

It will be seen, as this description progresses, that my arm rest is installed by inserting a flexible strap, the upper end of which is connected to the bottom of a padded plate, downwardly into the mouth provided in the sill of the window of an automobile and then connecting the lower end of the strap to the upper end of a spring, the lower end of which is connected to the lower portion of the door at a point intermediate the inner and outer walls thereof. The decorative cover on the inner wall of the door is removed so that the spring can be installed and so that the lower end of the strap can be connected to the upper end of the spring.

It will also be apparent that, in lieu of providing the spring and flexible strap, I may provide a strap which is sufficiently elastic to permit the elimination of the spring.

By connecting the padded plate of my arm rest to a door in the manner just described, the arm rest is rendered automatic in operation. That is, when the pane is fully retracted, the padded plate is urged downwardly against the sill to span the mouth formed therein and, when the pane is elevated, the padded plate is rocked in opposition to the spring to its non-use position.

The lower end of the above-mentioned flexible strap is preferably provided with a plurality of longitudinally spaced apertures and the upper end of the spring is provided with a hook receivable in a selected one of the apertures, thereby to establish the desired tension on the spring. Since, in a preferred embodiment of my invention, the spring is somewhat extensible and since I have provided a plurality of apertures in the lower end of the strap, my arm rest may be connected to a wide variety of types of doors.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

In the drawing, the single figure is a sectional view of a conventional automobile door showing my arm rest connected thereto.

Referring more particularly to the drawing, I have shown a conventional automobile door indicated generally by the reference numeral 10. Such a door is customarily provided with a window opening partially defined by a substantially horizontal sill 12, and comprises spaced inner and outer walls 13 and 14 defining a socket 15 having an open mouth 16 defined by inner and outer downturned lips 17 and 18 and interrupting the surface of the sill 12. Customarily, wipers 19 and 20 are supported from the lips 17 and 18, substantially engaging the inner and outer surfaces of a window pane 21 which is receivable in the socket 15 and which is elevatable, through the socket mouth 16, to close the window of the door 10. Customarily, a trim cover 22 overlies the inner door wall 13 as illustrated, the lower end of the cover 22 being releasably connected to the inner door wall 13 by means such as the illustrated screw 23 which is receivable in the illustrated opening 24.

My arm rest, indicated generally by the reference numeral 25 in the accompanying drawing, comprises a plate 26 of any suitable material, such as sheet metal, plastic or even wood. In the preferred form of my invention, the plate 26 may preferably be about twelve inches long, three and one-half inches to four inches wide and of any suitable thickness to provide desirable rigidity. Any desired form of padding such, for instance, as foam rubber, is mounted on the upper surface of the plate 26, as indicated at 27, and a suitable cover 28, which may be cloth, shoot plastic or any other readily flexible, protective material, is wrapped about the plate and padding completely to cover that assembly. Further, as indicated at the reference numeral 30, the cover may be provided with a zippered opening so that the cover can be changed. Such a zippered opening feature is highly desirable, especially if the cover is made of cloth.

The assembly of the plate 26, padding 27 and cover 28 is urged downwardly against the sill 12 by a strap 32, the upper end of which is connected to the plate 26 as indicated generally by the reference numeral 34 and the lower end of which is connected to the upper end of a spring 36 as indicated generally by the reference numeral 38. The lower end of the spring 36 is fastened to the lower portion of the door 10. In the illustrative embodiment, the lower end of the spring 36 is secured to the door by means of a spring wire clip 40 which is received in a conventional drain hole 42, the spring 36 having a loop 44 which is connected to the clip 40.

The connection 38 is preferably effected by providing a plurality of eyeleted apertures 46 into which the upper loop 48 of the spring 36 can be inserted. Thus, it will be apparent that the tension on the spring 36 and, consequently, the force with which the plate 26 is urged downwardly against the sill 12 is established by inserting the loop 48 into the proper aperture 46.

The connection 34 may be effected in any number of ways. In the illustrative embodiment, the upper end of the strap 32 is formed into a loop 50 which receives a pin 52, the ends of which are received in grooves, not shown, formed in the plate 26. In order to provide a smooth bottom surface for the arm rest 25, the cover 28 and the plate 26 are provided with registered, longitudinally extending openings 54 which receive the loop 50 and the pin 52. Of course, the pin 52 must be longer than the openings 54.

When the pane 21 is fully retracted, the force of the spring 36 will urge the assembly of the plate 26, padding 27 and cover 28 downwardly flush against the sill 12. However, when the pane 21 is elevated, the assembly is rocked to the position suggested by the dashed-line illustration thereof.

The arm rest 25 may be assembled to the door by fully retracting the pane 21, extending the lower end of the strap 32 downwardly through the mouth 16 and adjacent the inner surface of the pane 21, disconnecting the lower end of the cover 22, installing the spring 36 and the clip 40 and then making the connection 38 between the spring 36 and the strap 32.

We claim:

1. For use with an automobile having a window opening defined partially by a sill interrupted by a pane socket formed to provide a mouth opening through said sill, said socket being further defined by the inner and outer walls, and a window pane receivable in said socket and elevatable through said socket mouth to close said window opening; the invention which comprises a padded plate, and flexible and elastic connecting means for urging said plate downwardly against said sill to span the mouth therein, one end of said connecting means being connected to the bottom of said plate and the other end of said connecting means being connected to the lower portion of said socket at a point intermediate said inner and outer walls, and said plate and connecting means being arranged so that, when said pane is entirely received in said socket, said plate spans said mouth to provide an arm rest and, when said pane is elevated from said socket, said plate is moved by said pane in opposition to said connecting means to a non-use position.

2. The invention of claim 1 wherein said connecting means comprises a flexible strap and a spring, the upper end of said strap being connected to the bottom of said plate at a point intermediate the sides of said plate and the lower end of said strap being connected to the upper end of said spring, the lower end of said spring being connected to the lower portion of said socket.

3. The invention of claim 2 wherein the lower end of said strap is provided with a plurality of longitudinally spaced apertures and wherein the upper end of said spring is provided with a hook selectively receivable in one of said apertures to establish the desired tension on said spring.

4. The invention of claim 2 wherein said strap extends alongside the inner surface of said pane.

References Cited

UNITED STATES PATENTS 3,129,974   4/1964   Carter _____ 296—153
2,738,220   3/1956   Simmons _____ 296—153

PHILIP GOODMAN, *Primary Examiner.*